VARIATION OF INTERNAL POWER COMPONENTS
AS LASER IS TUNED — NEUTRAL SPECIES LASER

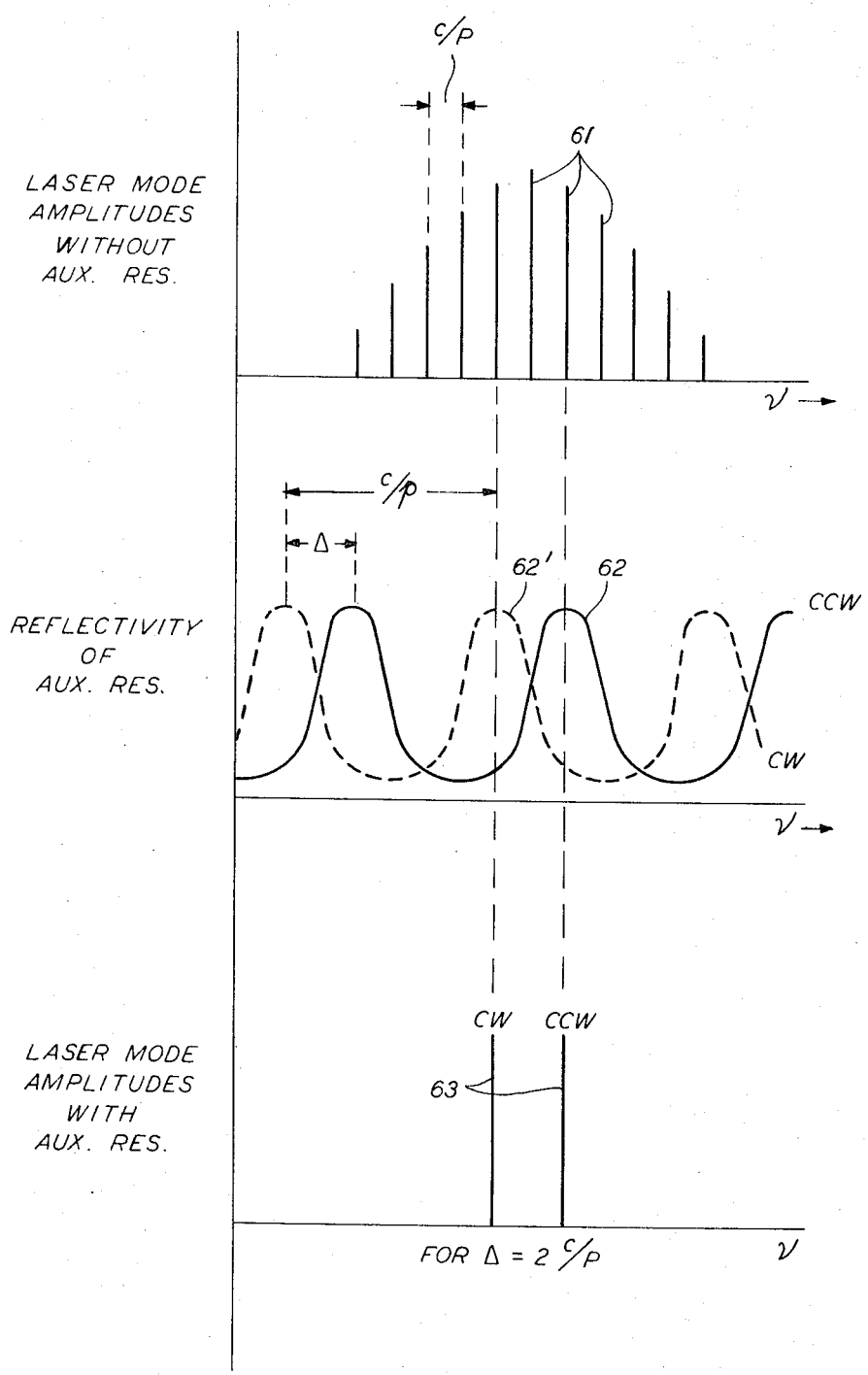

FREQUENCY DISCRIMINANT FROM
DIFFERENCE OF OUTPUTS —
NEUTRAL SPECIES LASER

United States Patent Office 3,537,027
Patented Oct. 27, 1970

3,537,027
**FREQUENCY-STABILIZED SINGLE
MODE RING LASERS**
Peter W. Smith, Little Silver, N.J., assignor to Bell
 Telephone Laboratories, Incorporated, Murray Hill and
 Berkeley Heights, N.J., a corporation of New York
Filed July 27, 1967, Ser. No. 656,519
Int. Cl. H01s 3/05
U.S. Cl. 331—94.5                                                3 Claims

ABSTRACT OF THE DISCLOSURE

A sensitive frequency discriminant based on the gain profile of the active medium can be obtained in a ring laser having a Doppler-broadened emission line by promoting stable competition between oppositely-propagating traveling-wave components of a single transverse mode and by tuning an auxiliary ring resonator that determines the frequency of the primary ring resonator to maintain substantially equal intensities of the oppositely-propagating waves. Stable competition can be achieved by a nonreciprocal device that splits the resonances for the oppositely-propagating waves by an integral number of the frequency spacings between longitudinal modes of the primary ring resonator. The discriminant is then used to stabilize the auxiliary ring resonator. In the case of a gas ion laser having a substantial ion drift rate, the properties of the medium can be used to stabilize the auxiliary ring resonator to a frequency near the natural line center of the active medium. The primary ring resonator is stabilized by locking one of its resonant frequencies to a resonance of the auxiliary ring resonator with a feedback circuit.

BACKROUND OF THE INVENTION

This invention relates to lasers and more particularly to apparatus for controlling the output frequency of a laser.

The development of lasers has made possible the generation and amplification of coherent electromagnetic waves in the optical frequency range, generally considered to extend from the farthest infrared portion to the spectrum through the ultraviolet. Due to the extremely high frequencies associated with wave energy in this light range, the coherent waves produced by lasers are capable of transmitting enormous quantities of information. The resultant extension of the usable portion of the electromagnetic spectrum has greatly increased the number of frequency channels available for communication and other uses.

In many actual and potential applications of the laser, such as communications, it is desirable that the laser output frequency have a high degree of stability. Nevertheless, the output of a laser is subject to frequency variations resulting from magnetic, thermal and other environmental fluctuations that effect the geometry and dimensions of the device.

In my copending patent application Ser. No. 553,482, filed May 27, 1966 now Pat. No. 3,484,719, and assigned to the assignee hereof, I have proposed one technique for stabilizing the output frequency of a laser to a resonance of a stable auxiliary resonator, which may be coupled to the primary laser resonator. Most such proposals are only as effective as the inherent stability of the auxiliary resonator. For additional improvement, it is necessary to supply an additional technique for stabilizing the frequency characteristics of the auxiliary resonator.

For example, one might seek to stabilize the auxiliary resonator to the natural line center of the active medium. The natural line center is that frequency at which the active medium can emit the greatest intensity of coherent radiation, and can be determined by tuning the laser resonator through a range of frequencies. The natural emission line of a laser has an appreciable width in terms of frequency because of broadening effects, such as the Doppler-broadening, which is produced by the random thermal motions of the atoms of the active medium. A technique for stabilizing a resonator to the natural line center may be found in the copending patent application of R. L. Fork and W. J. Tomlinson, Ser. No. 584,501, filed Oct. 5, 1966, and assigned to the assignee hereof. That technique is limited to a certain class of transitions in suitable materials. A more general technique is disclosed in the copending patent application of R. L. Fork, Ser. No. 434,883, filed Feb. 24, 1965, now Pat. 3,395,365 and assigned to the assignee hereof; but a greater sensitivity may be desired in some applications. In addition, the plurality of modes required by the latter technique may be objectionable in some applications.

Sensitivity, as used above, refers to the extent of variation of the error signal as the resonator is tuned through a band of frequencies around the natural line center. The variation of error signal of the frequency control system with respect to tuning will hereinafter be referred to as the "frequency discriminant." From the foregoing, it may be seen that a desirable frequency discriminant would be one that is both generally applicable to a broad class of lasers and also has improved sensitivity as compared to other generally applicable techniques.

SUMMARY OF THE INVENTION

According to my invention, a sensitive frequency discriminant based on the natural line center of the active medium can be obtained in a ring laser having a Doppler-broadened emission line by promoting stable competition between oppositely-propagating traveling-wave components of a single transverse mode and by tuning an auxiliary ring resonator that is coupled to the primary ring resonator to maintain substantially equal intensities of the oppositely propagating waves. In a first embodiment, stable competition is achieved by a nonreciprocal device that splits the resonances of the auxiliary ring resonator by an integral number of the frequency spacings between longitudinal modes of the primary ring resonator. In another embodiment, a gas ion laser, the stable competition is achieved by means of the ion drift in the active medium and by appropriate tuning of the auxiliary ring resonator to provide a common resonance of the primary and auxiliary ring resonators near the natural line center of the laser active medium.

Both of these embodiments of my present invention advantageously employ the highly mode-selective ring resonator configuration disclosed in my concurrently-filed patent application, Ser. No. 656,473.

BRIEF DESCRIPTION OF THE DRAWING

Further features and advantages of my present invention may be understood from the following detailed description, taken together with the drawing, in which:

FIG. 2 shows curves that are useful in understanding the theory and operation of the embodiment of FIG. 1;

DESCRIPTION OF ILLUSTRATIVE EMBODIMENTS

Figure 1:
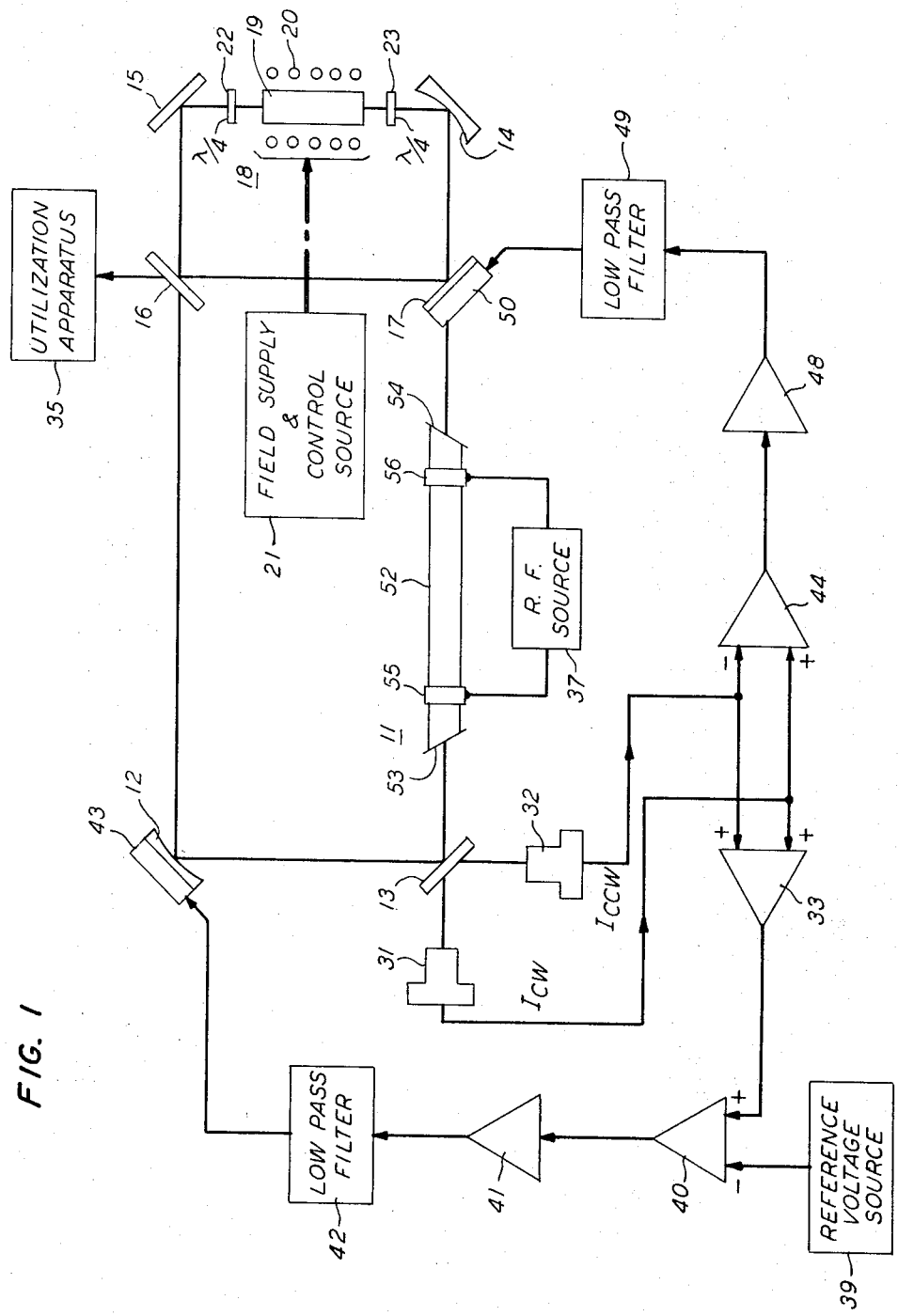
FIG. 1 is a partially pictorial and parially block diagrammatic illustration of a first embodiment of the invention.

In the embodiment of FIG. 1, a neutral-species gas laser 11 is provided with frequency stabilization according to my present invention. For example, the laser 11 could be a helium-neon laser operating on the transition at 6,328 angstrom unis. The compound ring resonator permits each of the two oppositely-propagating wave components to operate only a single longitudinal mode. Reflectors 12, 13, 14 and 15 form a primary ring resonator having a light propagation path passing along the axis of the active medium of laser 11. The partially transmitting reflectors 16 and 17, together with reflectors 14 and 15, form an auxiliary ring resonator having a light propagation path that overlies a portion of the light propagation path of the primary ring resonator. Reflectors 16 and 17 not only serve to couple the primary and auxiliary ring resonators, as will be more fully explained below, but are also oriented to direct out of the laser those modes of either direction of propagation that are not resonant in both the primary and auxiliary ring resonators. As explained in my above-cited concurrently-filed patent application, this arrangement of reflectors is capable of giving sharp mode selection.

The means for splitting the resonances of the auxiliary ring resonator by an integral number of the frequency spacings between longitudinal modes of the primary ring resonator comprises the Faraday rotator 18, including the Faraday element 19, field coil 20 surrounding element 19, and the field supply and control source 21 which supplies a current through field coil 20. The resonant splitting means also includes the quarter-wave plates 22 and 23 disposed on either side of the element 19 in the light propagation path of the auxiliary ring resonator. In the illustrated embodiment, the resonant splitting apparatus also is disposed in the light propagation path of the primary ring resonator, the two paths being common at this point. Quarter-wave plate 22 is oriented to convert incident planar polarized radiation into circularly polarized radiation; and quarter-wave plate 23 converts the circularly polarized radiation back to linear polarization in the same plane as when incident at the first quarter-wave plate 22. For the opposite direction of propagation, the roles of the two quarter-wave plates are interchanged. The purpose of the Faraday rotator 18 and the quarter-wave plates 22 and 23 is to introduce a phase difference, or optical path-length difference, between the oppositely-propagating circularly polarized waves.

The remainder of the control system is as follows. The primary ring resonator is stabilized to a resonance of the auxiliary ring resonator through a circuit comprising the phototubes 31 and 32 which respectively detect portions of the clockwise and counterclockwise-propagating waves, as coupled out through the partially transmissive reflector 13. The outputs of the phototubes 31 and 32 are additively amplified by an amplifier 33. The signal from amplifier 33 is then compared to a stable reference voltage from source 39 by difference amplifier 40 to produce the desired error signal which is indicative of any needed tuning of the primary ring resonator. This error signal is amplified by the power amplifier 41 and filtered by the low pass filter 42 to eliminate spurious high frequency signals. The resulting error signal is applied to the piezoelectric driver 43, which in known manner adjusts the position of reflector 12 to tune the primary ring resonator in the sense that will counteract the deviation of the laser output frequency. If desired, the error signal can be normalized to take account of fluctuations of total output power from beam splitters 16 and 17. A suitable normalization scheme is disclosed in my copending patent application, Ser. No. 641,646, filed May 26, 1967, and assigned to the assignee hereof.

The auxiliary resonator is stabilized with respect to the natural line center of the active medium by means of a feedback circuit that also acts upon the output signals of phototubes 31 and 32. The signals are applied to the difference amplifier 44 to produce an output signal indicative of the difference of their magnitudes. The difference signal is then amplified by power amplifier 48, and is filtered by low pass filter 49. The resulting error signal is then applied to piezoelectric driver 50 to tune the auxiliary resonator by varying the position of the reflector 17. Tuning is accomplished by varying the position of reflector 17 in the sense that tends to reduce the error signal and the deviation of the resonant frequency of the auxiliary resonator from the natural line center of the active medium of laser 11. If desired, the error signal can be normalized in the same way as the other error signal, for example, as disclosed in my above-cited copending patent application, Ser. No. 641,646.

Typically, low pass filter 49 will have a much lower cut-off frequency than low pass filter 42, in order to insure stability of the dual feedback system.

The laser 11 illustratively may have the following specific form. The helium-neon mixture provides pressures of the two gas components appropriate for the 6,328 angstrom unit transition. The gas is contained in a tube 52 with Brewster-angle end windows 53 and 54 and is excited by band-type electrodes 55 and 56 from a radio frequency power source 57. It should be understood, however, that any other laser could be substituted for laser 11 provided that it have a Doppler-broadened emission line or that it includes some other means for providing coupling between the oppositely-propagating wave components of the selected spatial mode. Doppler-broadening is the result of collisions between particles of the active medium and the resulting random velocities of the particles. It provides a greater width of the natural emission line than would result in the absence of such collisions.

The reflectors 12 and 14 are illustratively curved to focus the laser radiation in order to reduce its diffraction loss. Reflectors 12, 14 and 15 are highly reflective and substantially nontransmissive; and reflector 13 is only slightly transmissive to the degree required to drive the control signals. The transmissivities of reflectors 16 and 17 may be selected from a range of values depending upon the mode selectivity desired. For a gain of laser 11 of about ten percent per pass, the reflectivities of reflectors 16 and 17 are illustratively about sixty percent.

The material of element 19 in Faraday rotator 18 is illustratively terbium glass. The utilization apparatus 35 may illustratively include a photodetector, or other apparatus for utilizing a portion of the output radiation. The frequency stability of the output radiation makes it useful in many laboratory measurements such as length and time measurements.

The difference amplifiers 44 and 40 may be standard comparison amplifiers, or difference amplifiers, of the type conventionally used in the automatic control art. The summing amplifier 33 is also conventional. The power amplifiers 41 and 48 and low pass filters 42 and 49 are also conventional.

The operation of the embodiment of FIG. 1 may be more specifically explained as follows. The first feedback circuit that employs the sum of the signals from phototubes 31 and 32 is responsive to deviations of the resonances of the primary ring resonator from the relatively more stable resonance of auxiliary ring resonator. This relationship exists for the following reasons. If the auxiliary ring resonator is assumed stable, changes in the total internal power of the primary ring resonator correspond closely to fluctuations in the resonant frequencies of the primary ring resonator when the combination of reflectors has been initially adjusted to provide near maximum power output in the signal reflected from the partially reflective reflector 16. This fact is more fully explained in my first above-cited copending patent application, Ser. No. 553,482, now Pat. No. 3,484,719. In particular, it is there demonstrated that no power output is obtained for extremely high or low levels of internal power in the laser and that a maximum power output is always obtained for some intermediate level of the internal power level within the laser. The internal power level is always a rapidly varying function of tuning near the point of maximum output power.

These principles are applicable to the ring laser configuration shown in the embodiment of FIG. 1. The sum signal from the amplifier 33 may be readily recognized as being proportional to the total internal power level within the primary ring resonator and will indicate deviations in tuning of the primary ring resonator, assuming that the power-versus-tuning characteristics of the laser have not fluctuated substantially because of changes in the excitation from source 57 or of loss-producing effects within the active medium of laser 11. In order to compensate for the latter disturbances, the sum signal can be normalized with respect to output power, as mentioned above. In view of the flatness of the output power characteristic near the maximum power point, fluctuations in that output power are measures of the foregoing disturbances. It is assumed that these disturbances affect internal power substantially proportionally. The normalization is accomplished by a conventional technique for obtaining a quotient, and the resulting signal is applied to vary the position of reflector 12 by substantially conventional technique.

The operation of a second feedback circuit to stabilize the auxiliary ring resonator to the natural line center of the active medium may be explained more specifically with reference to FIG. 2.

The primary ring resonator has resonant mode spacings determined by its dimensions. The resonant modes are separated in frequency by the amount $c/P$, where $c$ is the velocity of light and $P$ is path length of the primary ring resonator in compatible units. The spacing and relative amplitudes of these modes with respect to frequency is shown in curve 61 of FIG. 2. These modes of the auxiliary ring resonator are much more widely separated in frequency than those of the primary ring resonator as shown, for example, by the separation of the successive peaks in either curve 62 or 62' of FIG. 2. This mode separation is $c/p$, where $p$ is the path length of the auxiliary ring resonator. Since $p<P$, this mode separation is much greater than that of the primary ring resonator.

With the two resonators coupled together as shown in FIG. 1, the effect of the auxiliary ring resonator is to act as a variable reflector for the primary ring resonator. Specifically, for the mode which is resonant in both of the resonators, an interference effect occurs at the partially transmissive reflectors 16 and 17 which reduces the output coupling below the value which would be determined solely by the reflectivities of those reflectors. The laser will tend to operate in a single mode determined by the frequency coincidence of modes of the primary ring resonator with the transmission peaks of the auxiliary ring resonator.

Two transmission curves 62 and 62' are shown in FIG. 2 because the Faraday rotator 18 and quarter-wave plates 22 and 23 employ the nonreciprocal properties of Faraday rotation to provide different path lengths and thus different resonant frequencies for the oppositely-propagating wave components of the single mode. With a small amount of splitting of the resonant frequencies of the auxiliary resonator, not more than one of these frequencies can coincide with a resonant frequency of the primary ring resonator, regardless of adjustment of the latter. The other frequency would tend to be quenched; and the laser would operate in a unidirectional traveling-wave mode. Stable competition can be provided by increasing the splitting to an amount, $\Delta$, which is equal to an integral number of the mode spacings of the primary ring resonator. Specifically, $$\Delta = n\frac{c}{P} \qquad (1)$$

Curves 62 and 62' of FIG. 2 assume $$\Delta = 2\frac{c}{P}$$

Curve 62 represents the counterclockwise-propagating mode and curve 62' represents the clockwise-propagating mode. The resultant response of the laser has amplitudes and frequencies shown by curve 63 of FIG. 2. Curve 63 represents a single transverse mode with oppositely-propagating wave components that are separated in frequency by the amount $$2\frac{c}{P}$$

These oppositely-propagating wave components draw energy in part from the same velocity class of atoms in the active medium, so that there is a rapid change in the relative amplitudes as the primary resonator is tuned.

Figure 3A:
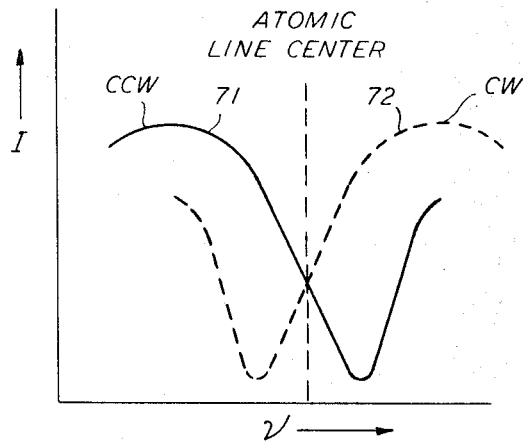
FIGS. 3A and 3B show further curves that are useful in understanding the operation of the embodiment of FIG. 1.
Figure 3B:
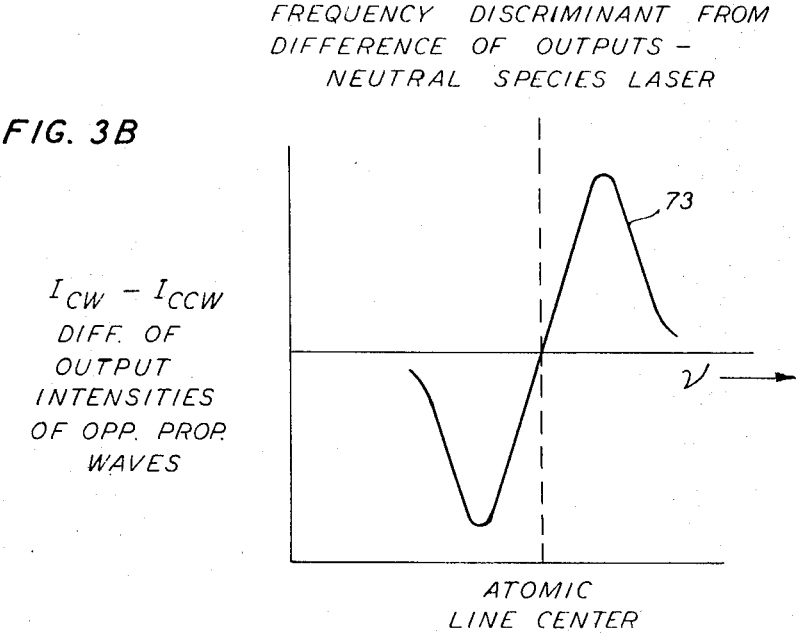

The result of the stabilized competition is illustrated by FIGS. 3A and 3B. In FIG. 3A, curve 71 represents the variation of the power of the clockwise-propagating wave, as detected by phototube 31, as the primary ring resonator is tuned to produce a variation of resonant frequency, $\nu$. Similarly, curve 72 represents the variation of power of the counterclockwise-propagating wave, as detected by phototube 32, with tuning of the primary ring resonator. The frequency discriminant produced at the output of the amplifier 44 is the difference in intensities of the two oppositely-propagating wave modes as shown by curve 73 of FIG. 3B. The variation of the intensity difference with respect to frequency provides a sharp frequency discriminant. This frequency discriminant is centered about the natural line center of the active medium. After normalization of the frequency discriminant signal for variation in excitation and loss within the laser, the resulting signal is applied through piezoelectric driver 50 to tune the auxiliary ring resonator to maintain substantially equal intensities of the oppositely-propagating waves.

Figure 4:
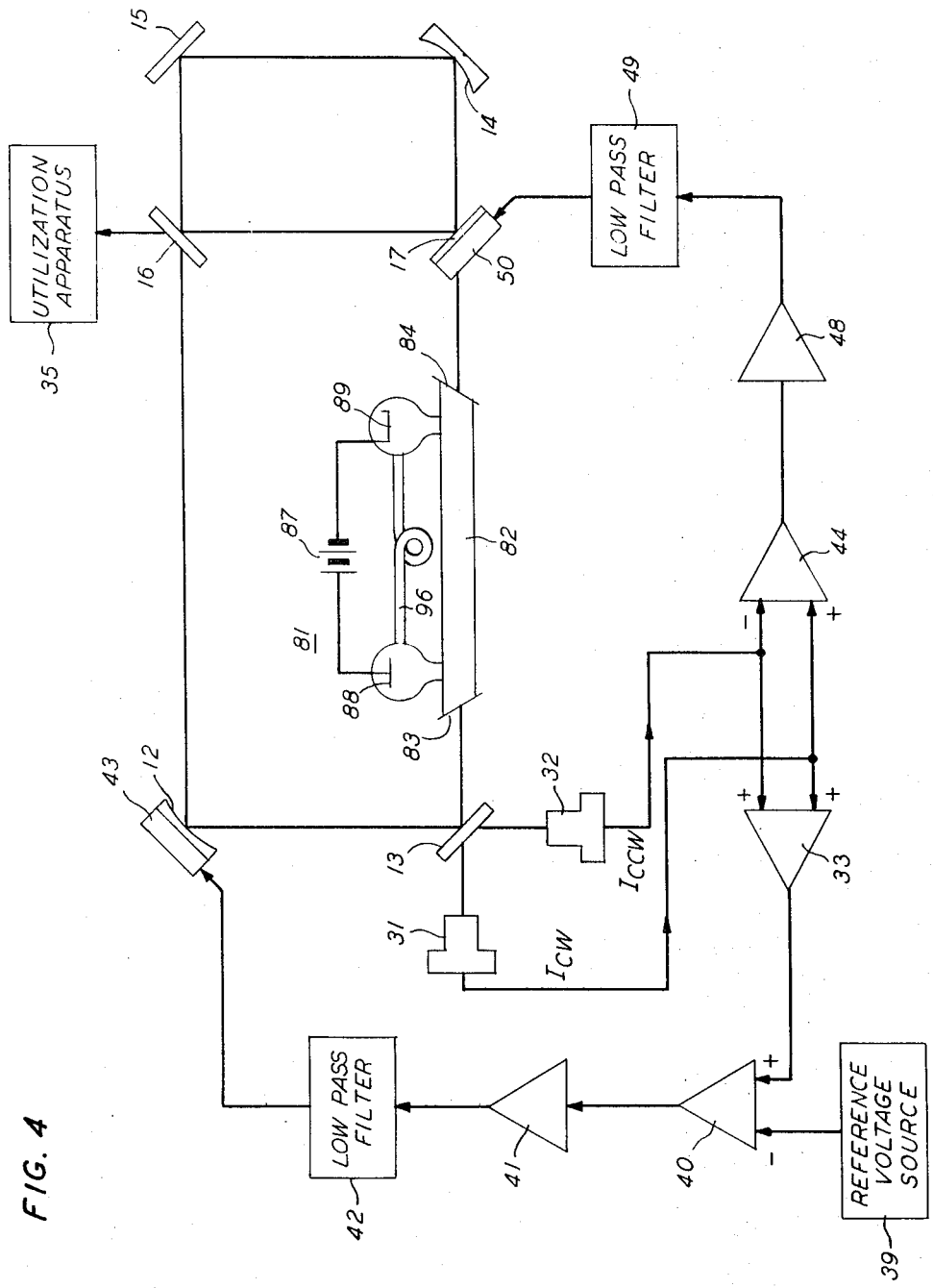
FIG. 4 is a partially pictorial and partially block diagrammatic illustration of a second embodiment of the invention for controlling the output frequency of a gas ion laser.

Stable competition between the oppositely-propagating wave components of a single transverse mode in a ring laser can also be achieved by means of ion drift in the active medium, as illustrated in the embodiment of FIG. 4. Here, components that are numbered the same as components of the embodiment of FIG. 1 may be substantially identical.

Figure 5A:
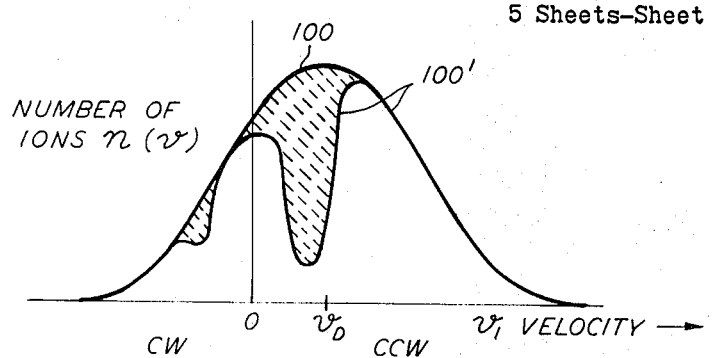
FIGS. 5A, 5B, 5C and 5D show curves that are useful in understanding the theory and operation of the embodiment of FIG. 4.

The primary change in the apparatus is the substitution of an ion laser 81 for the more general Doppler-broadened laser of FIG. 1. The ion drift in the ion laser 81 permits the Faraday rotator 18 and quarter-wave plates 22 and 23 of FIG. 1 to be completely eliminated from the apparatus. Typically, the ion laser 81 would be an argon ion laser including argon gas contained in the tube 82 and excited by a direct-current power source 87 connected between the anode 88 and cathode 89. An ion return path 90, somewhat longer than the discharge length of the tube, is provided between the anode and the cathode. A continuous circulation of ions results, which produces two distinctive gain curves with respect to frequency for the oppositely-propagating waves as shown in curves 101 and 102 of FIG. 5B. The curve which can uniquely characterize the ionized active medium is curve 100 of FIG. 5A which depicts a number of ions, $n(v)$ versus $v$, the velocity of those ions. The peak of this curve falls at the average drift velocity, $v_D$. The single transverse mode, with its oppositely-propagating wave components, will draw its energy from two velocity groups of atoms within the curve 100, thereby "burning holes" in the curve as shown by modified curve 100' of FIG. 5A. Since oppositely-propagating waves, if they have substantially the same frequency, present apparently different frequencies to atoms moving relative to them along the same axis, the two contributing velocity groups of atoms will be disposed on either side of the zero-velocity axis.

Now let us assume for the moment that the single resonant transverse mode in the laser includes a counter-clockwise-propagating component at substantially the same frequency, $v_1$, the clockwise-propagating component, $v_1$ being substantially removed from the natural line center frequency, $v_0$. In the absence of any interaction between the clockwise-propagating waves and the counter-clockwise-propagating waves, the difference in intensities of the oppositely-propagating waves would be essentially as illustrated by curve 103 of FIG. 5C.

Figure 5B:
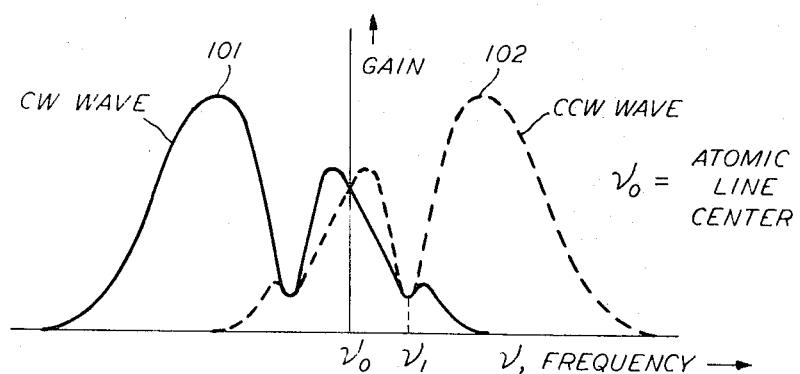
Figure 5C:
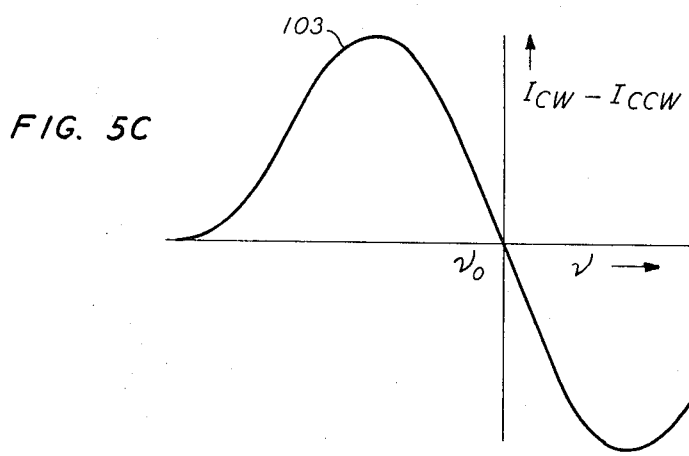

The values of the curve 103 in FIG. 5C may be derived by moving the coinciding holes in FIG. 5B on the appropriate side of the ordinate to each value of frequency in question and measuring the difference in area of the coinciding holes. The holes tend to become wider as moved toward higher values of gain.

Figure 5D:
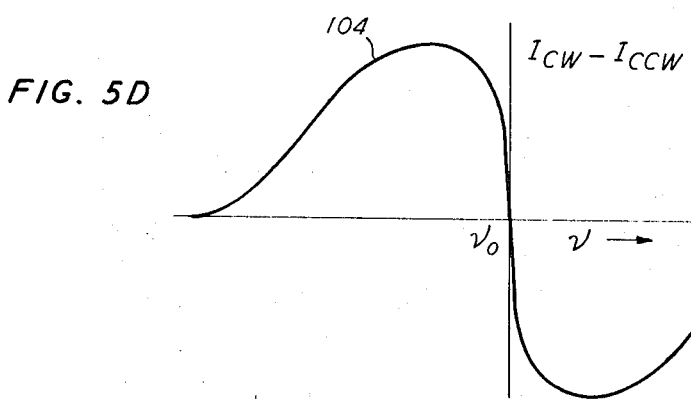

If the frequency of the oppositely-propagating waves is brought close to $v_0$, where $v_0$ is the natural line center of the active medium, then some atoms will interact with both the clockwise and counterclockwise-propagating waves. The resulting competition between these waves will cause the plot of FIG. 5C to be changed, in the vicinity of $v_0$, to that of FIG. 5D. Curve 104 of FIG. 5D has a sharper slope in the region of $v=v_0$ than does curve 103 of FIG. 5C.

In the operation of the embodiment of FIG. 4, the auxiliary ring resonator is initially adjusted to support a mode of the primary ring resonator that is very near the natural line center, $v_0$. The feedback circuit including the difference amplifier 44 detects the intensity difference of the oppositely-propagating waves to produce a signal of a form shown in FIG. 5D. When this signal is employed to drive the piezoelectric driver 50 as shown to reduce the error signal, the intensities of the oppositely-propagating waves are maintained substantially equal.

The remainder of the feedback system operates substantially as explained above for the embodiment of FIG. 1.

It should be appreciated that other modifications within the principles of the present invention can be made. For example, other nonreciprocal effects within the ring laser could be employed to stabilize the competition between the oppositely-propagating waves. The mechanism selected would preferably be selected to take advantage of the characteristics and strength of competition effects in the active medium of the particular laser of interest. Suitable competition effects can be found in nearly all laser active media.

What is claimed is:
1. Apparatus for generating frequency-controlled coherent electrolagnetic wave energy, of the type comprising
a primary optical resonator,
an active medium disposed in said primary resonator, said medium being capable of supporting several oscillating modes within said resonator,
means for pumping said active medium at a level sufficient to support oscillations in two of said modes within said active medium,
an auxiliary optical resonator disposed within said primary resonator and coupled to said primary resonator by beam splitters oriented to direct out of said apparatus modes that are not resonant in both said primary and said auxiliary resonators, and
feedback means for tuning said primary resonator to stabilize its resonances with respect to the resonances of said auxiliary resonator, said apparatus being characterized in that
said primary optical resonator and said auxiliary optical resonator comprise ring resonators both resonant for oppositely-propagating wave components of one mode in said resonators, said apparatus including
means disposed within at least one said ring resonator for supplying a directional anisotropy in said one ring resonator to support two oppositely-propagating traveling wave components of one mode at differing frequencies in said ring resonator, said directional anisotropy having a value to provide a path length difference yielding a frequency difference for the oppositely-propagating wave components equal to an integral number of the frequency spacings between longitudinal modes of the primary ring resonator, and
feedback means responsive to an intensity difference between said oppositely-propagating components for tuning said auxiliary resonator to stabilize the intensity difference of said oppositely-propagating wave components.

2. Apparatus according to claim 1 in which the means for supplying a directional anisotropy comprises
nonreciprocal means disposed in the auxiliary ring resonator for producing an optical path length difference for oppositely-propagating wave components in said auxiliary ring resonator to provide resonant frequencies of both said resonators for the oppositely-propagating wave components which are separated by said frequency difference.

3. Apparatus for generating frequency-controlled coherent electromagnetic wave energy, of the type comprising
a primary optical ring resonator,
an active medium disposed in said primary resonator, said active medium being capable of supporting several oscillating modes within said resonator,
means for pumping said active medium at a level to support oscillations in two of said modes within said active medium,
an auxiliary optical ring resonator disposed within said primary resonator and coupled to said primary resonator by a plurality of beam splitters oriented to direct out of said apparatus modes that are not resonant in both said primary and said auxiliary resonators, said auxiliary resonator being resonant for only one mode that is resonant in said primary resonator, and
feedback means for tuning said primary ring resonator to stabilize its resonances with respect to the resonances of said auxiliary ring resonator,
said apparatus being characterized in that said auxiliary optical resonator includes
a Faraday rotator disposed in said auxiliary resonator and a pair of quarter-wave plates disposed about said Faraday rotator in said auxiliary resonator, said Faraday rotator poducing a Faraday rotation and an associated optical path length difference for oppositely-propagating wave components of said one mode to provide resonant frequencies for the oppositely-propagating wave components which are separated by an integral number of mode spacings of said primary resonator.

References Cited

UNITED STATES PATENTS

| | | | |
|---|---|---|---|
| 3,134,837 | 5/1964 | Kisluik et al. | 331—94.5 |
| 3,187,270 | 6/1965 | Kozelnik et al. | 331—94.5 |
| 3,277,392 | 10/1966 | Nicolai | 331—94.5 |
| 3,382,758 | 5/1968 | Wang | 356—106 |
| 3,395,365 | 7/1968 | Fork | 331—94.5 |
| 3,395,367 | 7/1968 | Bell et al. | 331—94.5 |
| 3,411,849 | 11/1968 | Aronowitz | 356—28 |

OTHER REFERENCES

Ballik: Physics Letters, vol. 4, pp. 173–176, April 1963.

Rigrod et al.: IEEE Journal of Quantum Electronics, vol. QE–1, pp 298–303, October 1965

Smith et al.: Proceedings of the IEEE, vol. 53, p. 161, February 1965.

Tang et al.: Applied Physics Letters, vol. 2, pp. 222–224, June 1963.

RONALD L. WIBERT, Primary Examiner

E. BAUER, Assistant Examiner

U.S. Cl. X.R.

356—106